Aug. 14, 1934.  R. P. SCHERER  1,970,396
METHOD OF AND MACHINE FOR MAKING CAPSULES
Filed Oct. 12, 1931  4 Sheets-Sheet 1
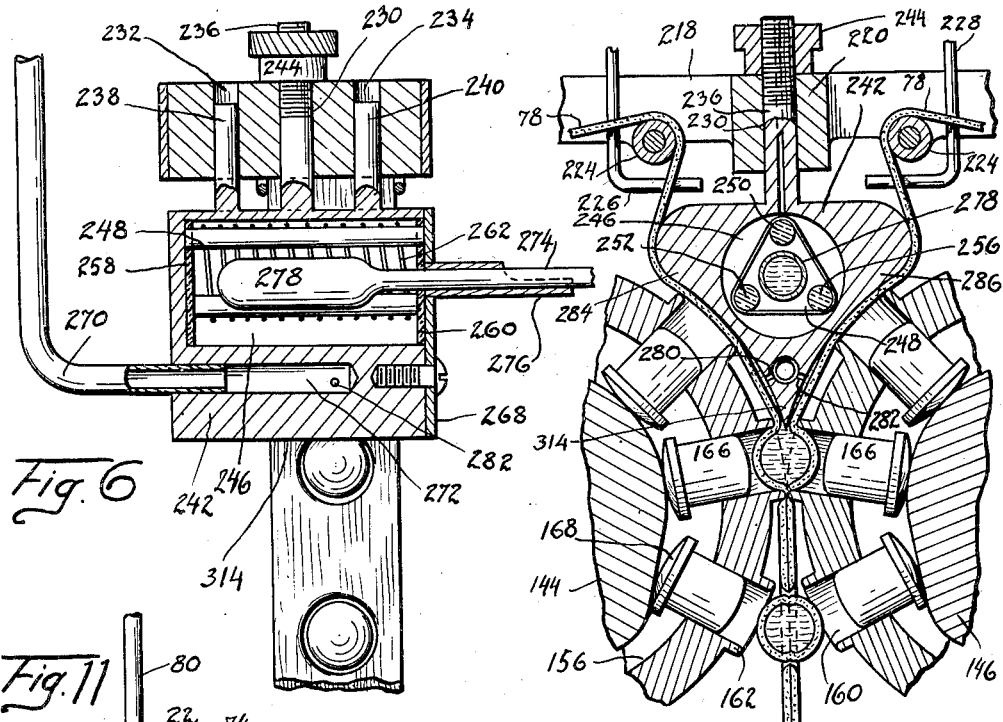

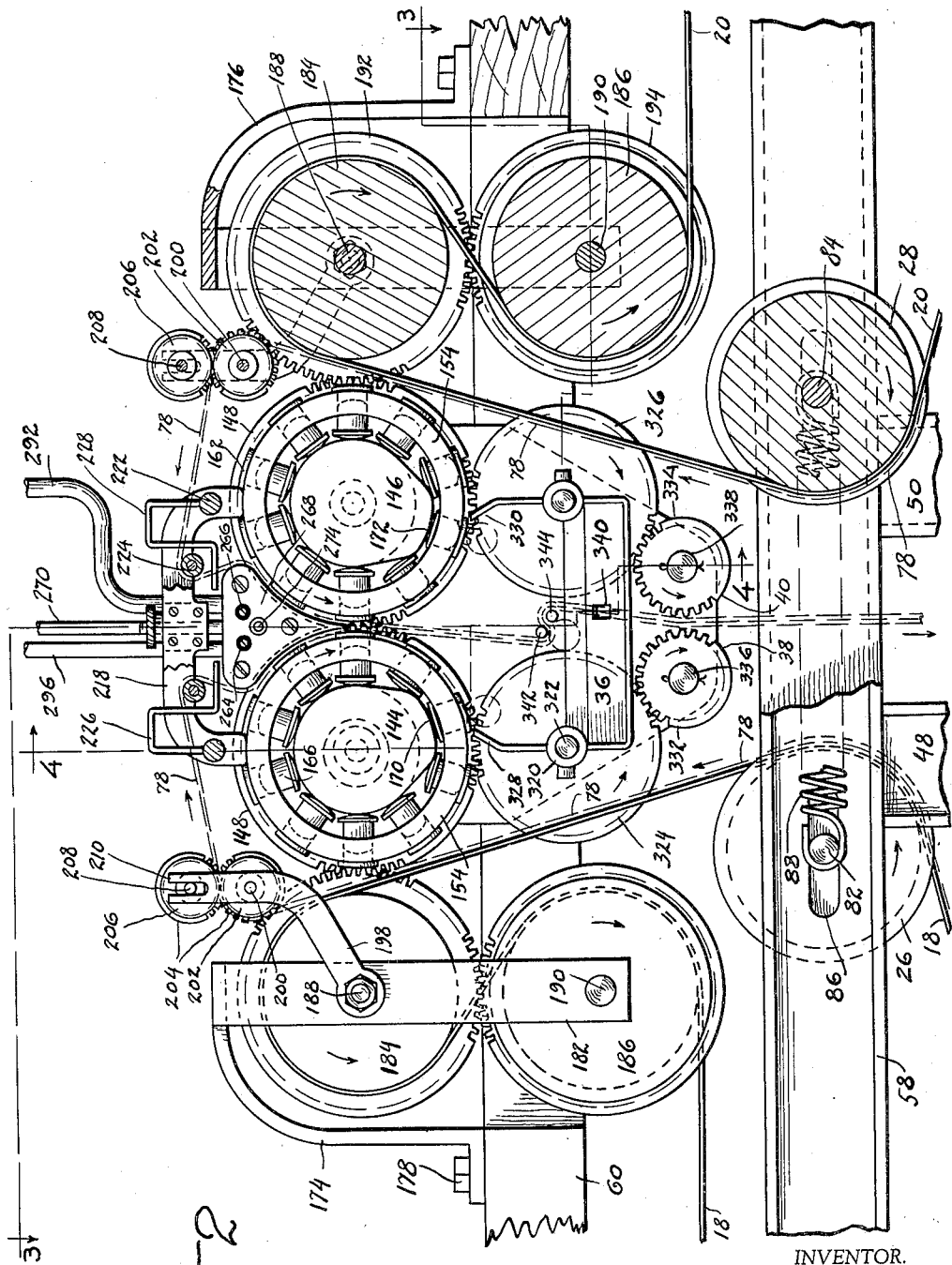

Aug. 14, 1934.  R. P. SCHERER  1,970,396
METHOD OF AND MACHINE FOR MAKING CAPSULES
Filed Oct. 12, 1931  4 Sheets-Sheet 3
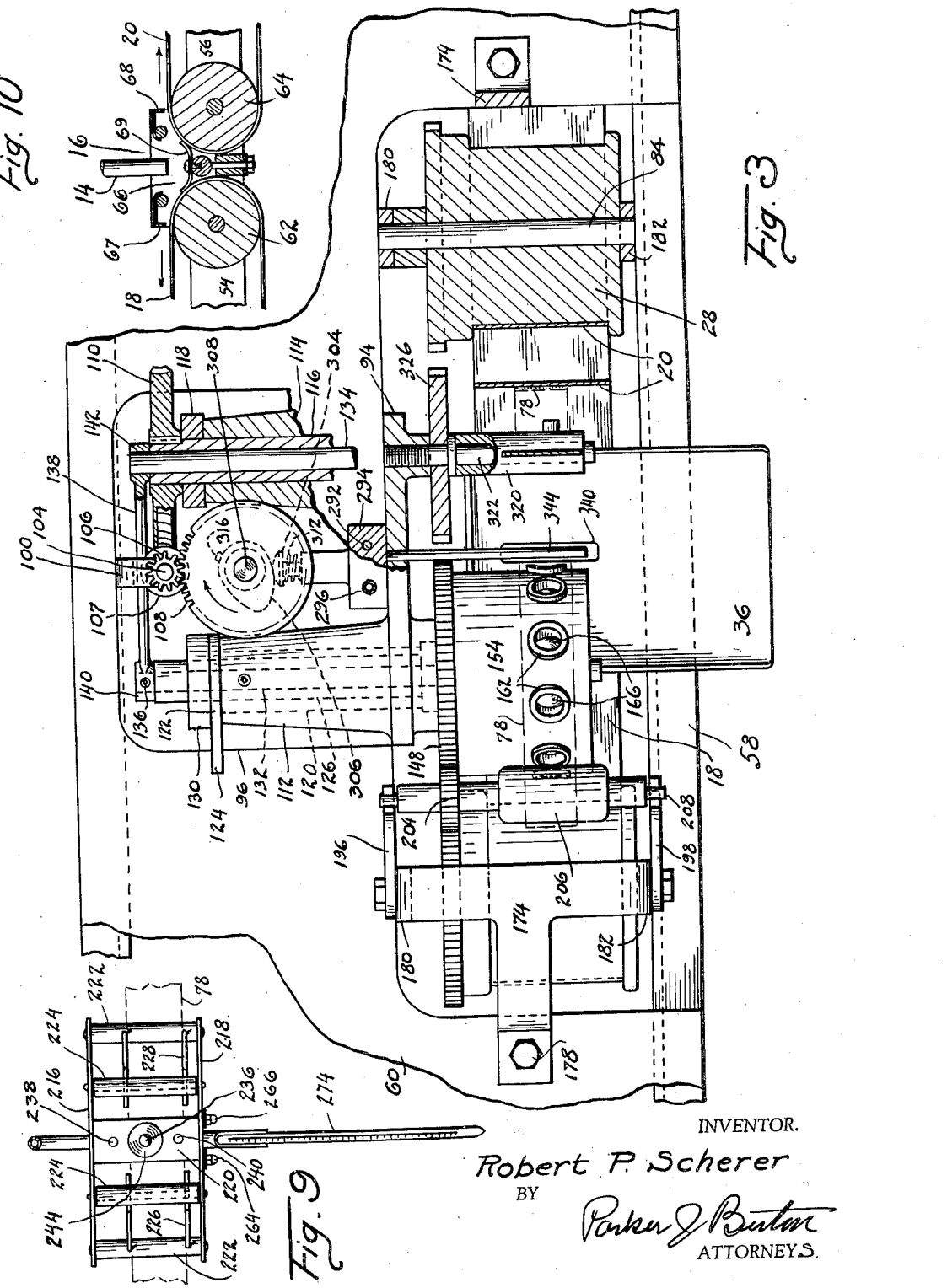

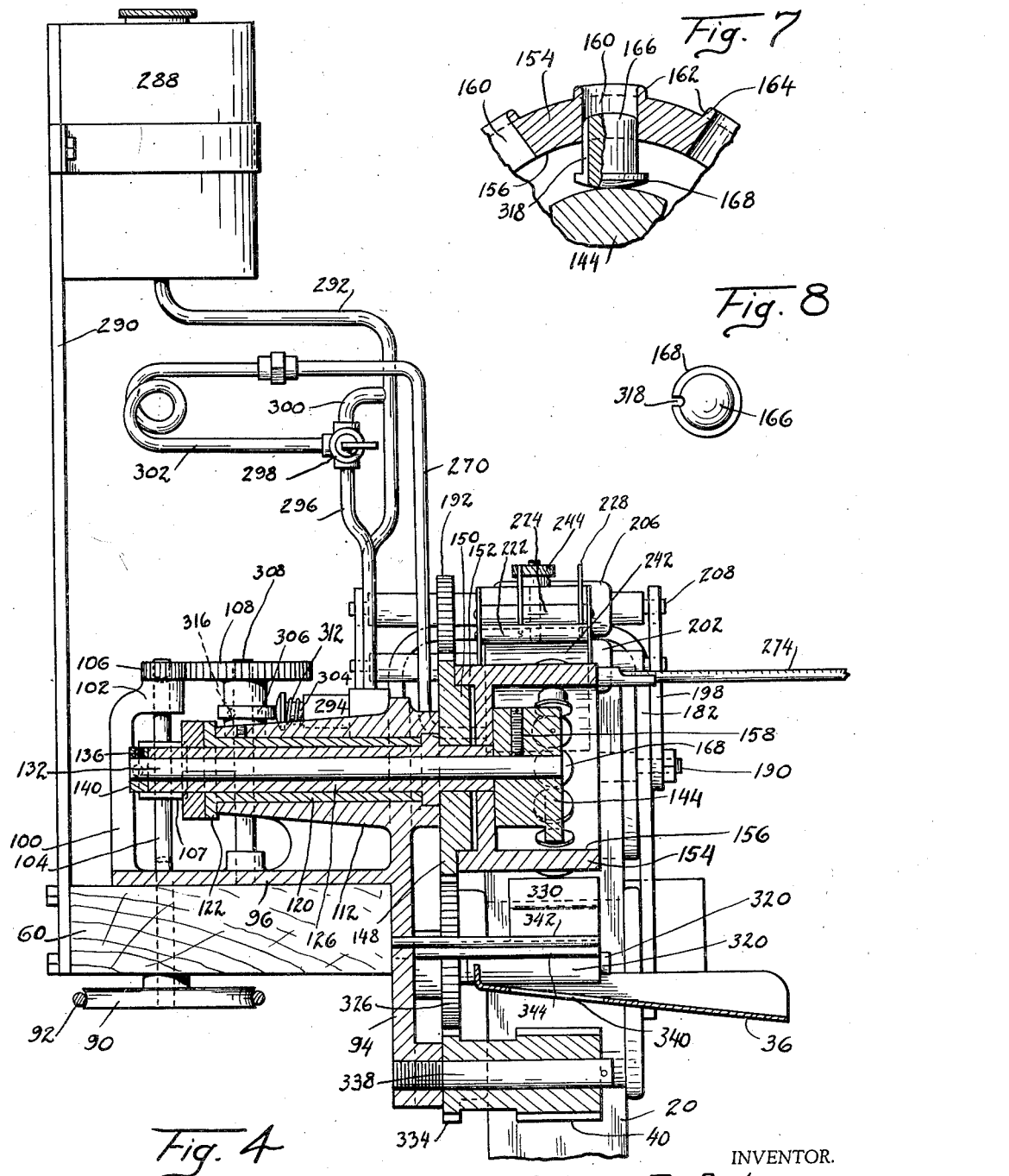

Patented Aug. 14, 1934

1,970,396

UNITED STATES PATENT OFFICE 1,970,396

METHOD OF AND MACHINE FOR MAKING CAPSULES

Robert P. Scherer, Detroit, Mich.

Application October 12, 1931, Serial No. 568,230

9 Claims. (Cl. 18—21)

My invention, in its broader aspects, relates to an improved method of and mechanism for forming a covering or envelope about a fluid substance. An important feature of the invention resides in the adaptability of both method and mechanism to fluid substances varying widely as to viscosity.

An important object of the invention is to form the covering "around" the substance which is to constitute the interior or core of the finished product. In this way all matter foreign to the core substance itself is expelled during the forming operation. This feature is of great importance where capsules of a medicinal nature are involved because the possibility of air bubbles in the finished product is substantially eliminated thereby.

Another broad object of the invention is to facilitate the forming of an envelope or capsule so that this operation may be performed substantially automatically over an indefinite period of time without the necessity of manual manipulation.

Another very important object of the invention, and one relating more specifically to the manufacture of medicinal products including a core and a covering or envelope therefore, is to eliminate substantially all the waste which now accompanies such manufacture by insuring a uniform product substantially free from defects, such as air bubbles within the capsules, ragged sealing, et cetera, which necessarily result from the manufacture of the articles as now practiced.

Heretofore in the manufacture of capsules containing any fluid substance, or medicinal compound such as oil, et cetera, it has been the practice to provide two substantially flat gelatine plates, arrange the said plates between two die plates containing a plurality of forming dies, insert the oil, or whatever substance is to be utilized, between the two plates, and subsequently force the die plates together. The formation of the capsules in this manner is a relatively laborious procedure inasmuch as it entails careful manipulation by the operator of the gelatine plates and the resulting product is not only lacking in uniformity by reason of the human element involved, but is very apt to be inferior by reason of the fact that it is almost impossible to prevent the entrance of air into some of the capsules formed during each of the die stamping operations due to careless manipulation by the operator.

In accordance with present manufacturing practice, the lower die member is provided with a vertical marginal flange over which a flat gelatine sheet is laid. The central portion of the sheet sags down and rests upon the die flanges projecting above the surface of the plate, the marginal portions of the sheet remaining spaced thereabove an increasing amount by reason of the sag from the marginal flanges. The fluid substance is then placed in the pocket so formed, the major portion thereof remaining in the central portion by reason of the greater depth at that point. The edge of a second gelatine sheet is then deposited on a corresponding edge of the first sheet and laid thereacross until it lies in superimposed relation to the first sheet. As a matter of fact, the upper or second sheet is rolled onto the surface of the fluid substance during this operation, and this rolling action tends to force out the air from between the sheets, leaving only the fluid substance therebetween. However, some air usually remains.

A similar upper die plate is then forced down upon the superimposed sheets to form the capsules. This operation squeezes the fluid substance from the deeper center portion towards the marginal portion, but since the respective halves of the capsules are formed and the two sealed together when the projecting die flanges abut one another, the result is that the squeezing action has not, as a rule, forced sufficient of the fluid substance to the marginal portions of the sheets to form as large a capsule as is formed at the central portion of the die plates. There is, therefore, a complete lack of uniformity in the size of the capsules formed upon each operation. The fact that it is difficult to force out all of the air from between the gelatine sheets as the upper sheet is laid upon the surface of the fluid frequently results in the formation of air bubbles in the capsules. Furthermore, this present practice necessitates the use of a fluid substance having a relatively low viscosity so that it will flow uniformly between the sheets and insure a fair percent of satisfactorily filled capsules or envelopes.

Another difficulty inherent in the present practice of manufacturing medicinal capsules resides in the fact that unless the thickness of each gelatine sheet is exactly the same, one half of the capsule will be larger than the other and the product will present a lopsided appearance.

The most painstaking care on the part of the operator cannot eliminate completely the waste resulting from such products. Such waste is to be found in the undersized capsules formed at the marginal portion of the die plates. These must be salvaged, separated into their component parts, and the material utilized again to avoid prohibitive waste. The same is true of the lopsided capsules resulting from lack of uniform thickness of the gelatine sheets. What may be regarded as secondary capsules are formed in the interstices between the capsule forming dies and these must be salvaged in similar fashion. The capsules containing air bubbles must likewise be reclaimed. Manual manipulation of the gelatine sheets renders it difficult to maintain them at the proper sealing temperature and leaky capsules frequently result. These also must be reclaimed. It will be apparent that much time and labor are necessitated for reclaiming these materials. Such waste is entirely eliminated through my improvement.

Among the specific objects of my invention are the securement of accuracy with reference to the content of fluid substance within the envelope, elimination of lopsided capsules resulting from lack of uniform thickness of the gelatine sheets, elimination of air bubbles within the capsules, the formation of a neat seal, as well as a leak proof seal, by reason of closer control of conditions affecting the consistency of the gelatine, and the elimination of the time and labor consumed in reclaiming faulty products.

Another feature of my invention resides in the arrangement of the mechanism, whereby the forming operation may be substantially continuous over an indefinite period of time.

Still a further object is to insure a uniform product by providing means whereby an accurately measured quantity of fluid substance is placed in each capsule.

While the specification and claims herein may specify "gelatine" as the substance formed into strips and utilized to form a shell or covering about a fluid substance, I wish it understood that such use of the term is intended to be generic and refers to any suitable substance adapted to form a satisfactory covering. The same is true of the terminology applied to the interior substance of the capsule, which is referred to throughout as "fluid substance". Furthermore, it should be understood that the term "capsule", where utilized, does not necessarily refer to the conventional medicinal article, but is intended as generic for any article comprising a fluid substance contained within an outer covering.

Various other objects and meritorious features of this invention will be apparent from the following description taken in conjunction with the drawings wherein like numerals refer to like parts throughout the several figures and wherein:

Fig. 1 is a front elevation, diagrammatically illustrated of the entire mechanism, Fig. 2 is a front elevation, partly in section, of capsule forming portions of the assembly, Fig. 3 is a section along 3—3 of Fig. 2 with the guide member removed, Fig. 4 is a section along 4—4 of Fig. 2, Fig. 5 is an enlarged sectional illustration of a capsule forming mechanism per se, Fig. 6 is a vertical section through the center of Fig. 5, Fig. 7 is an enlarged sectional illustration of the capsule ejecting mechanism, Fig. 8 is a plan view of the ejector itself, Fig. 9 is a plan view of the guide member which directs the gelatine strips through the capsule forming mechanism, Fig. 10 is a vertical section through the spreader which forms the gelatine strips, and Fig. 11 is a section through 11—11 of Fig. 1.

Referring now particularly to the diagrammatic illustration of Fig. 1, numeral 10 represents a gelatine storage tank in which the gelatine from which the envelopes or coverings are to be formed may be liquefied by any desired type of heating mechanism. It is preferably to utilize electric heating coils for this purpose and a plug 12 has been illustrated for connecting the coils, not illustrated, within the supply tank 10. The liquefied gelatine is adapted to flow through the conduit 14 by gravity into the spreader 16 which is maintained at the proper temperature by electric coils, thus further insuring the proper consistency of the gelatine prior to spreading it upon endless webs 18 and 20.

The spreader, which will be described more in detail hereafter, spreads the gelatine upon the central portions of the webs in a thin sheet of definite width, which width is substantially less than that of the webs, and the strips so formed are carried by means of the webs around the rollers 22 and 24 and the tension rollers 26 and 28 to points 30 and 32 at which points the gelatine is stripped from the webs and carried in converging relation to one another to the capsule forming mechanism broadly indicated in this figure by the numeral 34.

The capsule forming mechanism includes means for injecting any desired fluid substance between the converging strips of gelatine and forming the capsule thereabout. The formation of the capsule from the gelatine strips automatically severs the capsule from the strips, although provision is made for stripping the capsules therefrom in the event that complete severance should not result from the forming operation. These capsules fall by gravity into a chute 36 and from there they are deposited in any suitable container, not illustrated.

The two juxtaposed strips from which the capsules have been formed are drawn through a slot provided in chute 36 by means of friction rolls 38 and 40 and are then free to continue by gravity into a guide chute 42 by which they are subsequently deposited into a container 44. This salvaging of the strips after the capsules have been formed therefrom eliminates all waste and the salvaged material may be placed in a heating tank to maintain a proper supply of liquid gelatine.

In the diagrammatic illustration of Fig. 1 a suitable support for the structure has been illustrated in the form of vertical legs 46, 48, 50, and 52, between which the various rollers are journalled, and horizontal cross members 54, 56, 58 and 60 which are adapted to retain the frame work in a rigid position.

The spreader 16 into which the heated gelatine is deposited by gravity flow through the conduit 14 is illustrated in detail in Fig. 10 and is adapted to seat upon the adjacent rolls 62 and 64 over which the webs 18 and 20 are adapted to pass. It is of box-like formation and includes a trough-like portion 66 into which the liquid gelatine is deposited, the extremities of the trough being in contact with the respective webs 18 and 20 as they pass over the rolls 62 and 64. It will be apparent that as the webs pass around the rolls, the interior of the box-like spreader being substantially filled with liquid gelatine, the webs will pick up a coating of gelatine. The extremities of the spreader are provided with doctor blades 67 and 68 which are adjustable to insure any desired thickness of gelatine strip as the webs 18 and 20 emerge from the spreader.

The strip of liquid gelatine having been deposited upon the upper surface of webs 18 and 20, these webs, as hitherto stated, are carried around the various rollers illustrated to the capsule forming mechanism 34. Each of these rollers is of a particular formation which is clearly illustrated in Fig. 11 and they include a central hub portion 72 having flanges 74 and 76 at each extremity thereof. The web 18 contacts only the outer periphery of the flanges 74 and 76, the small inner hub portion 72 permitting the gelatine strip 78 deposited upon the web to pass around the roller structure without contacting any portion thereof. Each of the rollers is mounted in any suitable manner upon a cross shaft 80 suitably journalled between the vertical legs 46 of the frame.

With the exception of rollers 26 and 28, those journalled in the frame structure are all alike. These latter rollers, however, need not be centrally relieved as hitherto described because of the fact that the gelatine strip is on the outside of the web as it passes over these rollers. Each of these rollers 26 and 28 is journalled upon a cross shaft 82 and 84 and is supported for longitudinal movement in slots 86 in the horizontal frame members 58. The coil spring 88 is secured at each end to cross shafts 82 and 84, thereby tensioning the web. After the webs 18 and 20 with their respective strips of gelatine 78 adhering thereto have passed over the tension rollers 26 and 28 they are led to the mechanism which constitutes the capsule forming structure per se.

It will be apparent as a description of the mechanism follows that the improved capsule forming device per se need not necessarily be used in conjunction with the structure heretofore described, such particular structure having been illustrated and described simply as a suitable form of complete assembly. Other mechanism suitable to perform the desired functions, which are part of the improved process, may be utilized.

The power for driving the entire mechanism may be of any suitable type, such as an electric motor, connected up with a drive wheel 90 as by means of a belt 92 (see Fig. 4). A base casting 94 is provided with a supporting flange 96 which is adapted to seat upon a horizontal member 60 of the frame assembly. The rear extremity of the flange 96 is provided with a vertically extending arm 100 which has a turned over boss 102 at its extremity. The drive wheel 90 is secured to one extremity of shaft 104, which shaft extends through alined aperture in the frame member and the flange 96. A pinion wheel 106 is secured to the end of shaft 104 opposite that to which the drive wheel 90 is secured, the two functioning to retain the shaft in position. A worm gear 107 is also secured to shaft 104.

The pinion wheel 106 is arranged to drive a gear wheel 108 which functions to operate a pump for the purpose of injecting a fluid substance upon adjacent faces of the converging gelatine strips.

The base casting 94 is provided with a pair of laterally projecting sleeves 112 and 114. Within the sleeve 114 is rotatably journalled a second sleeve 116 to the rear extremity of which is splined the worm wheel 110. A spacer collar 118 separates the central boss of the worm wheel from the extremity of the outer sleeve 114.

Within the other sleeve 112 projecting laterally rearwardly from the base casting 94 is journalled an eccentric sleeve 120 having a peripheral flange 122 at the rear extremity of which is secured in any suitable manner a manually manipulable handle 124. A second sleeve 126 is positioned within the eccentric sleeve 120 and extends rearwardly beyond the extremity of the flange 122 thereof to support thereon a positioning collar 130 adapted to bear against the flange 122. Shafts 132 and 134 extend through the central portions of the respective sleeve assemblies, the shaft 132 being secured to a collar 140 as by means of a screw 136 and shaft 134 being secured similarly to collar 142. Collars 140 and 142 are connected by rod 138 the extremities of which fit into apertures in said collars, thus preventing rotation of these parts and allowing lateral adjustment between sleeve assemblies. Each of the shafts 132 and 134 project outwardly beyond the sleeves 126 and 116 respectively and have secured to these projecting extremities cam shaped members 144 and 146, respectively, for the purpose of actuating the capsule ejecting members 166 in a manner to be hereafter described.

The eccentric sleeve 120 may be rotated by handle 124 to adjust the relative position of the die rolls 154.

Spur gears 148 are mounted upon each of the sleeves 126 and 116 adjacent to the outer extremities thereof and are splined thereto for rotation therewith. Said ring gears 148 are positioned in such a manner that they mesh with one another as clearly illustrated in Fig. 2 and one is driven by the other.

Each of the spur gears 148 is provided with a central projecting boss 150 about which is press fitted the cylindrical flange 152 of a die roll 154. It will therefore be apparent that through rotation of the worm wheel 110 the sleeve 116 is rotated and its associated die roll 154 is constrained to rotate also whereby the spur gear 148 is rotated and this in turn causes the other spur gear and its associated die roll to rotate in unison therewith by virtue of the engagement of the two spur gears 148.

Each of the die rolls 154 is bored out as indicated at 156 to receive the aforementioned cams 144 and 146, which cams are secured to the extremity of the shafts 132 and 134 respectively by means of screws 158. Referring now to Fig. 7 for a more precise description of the die roll. Each roll is provided at regularly spaced intervals around its periphery with apertures 160 and each aperture is provided around its outer periphery with a circumferential die flange 162 which projects upwardly somewhat beyond the cylindrical surface of the die roll proper 154. Each of these circumferential die flanges 162 is beveled at its upper surface as indicated clearly at 164 for a purpose to be more clearly brought out hereinafter. An ejection element 166 is slidable within each of the apertures, each ejection element being provided with a convex head 168 interiorly of the die roll 154. Each ejection element is provided with a longitudinal groove 318. These ejection elements are adapted to slide by force of gravity to their innermost position, this sliding movement being limited by means of the cams 144 and 146 positioned within the interior of each of the die rolls 154.

Each of the cams 144 and 146 is peculiarly shaped as clearly indicated in Fig. 2, the purpose of the cam shape being to positively force the ejection elements 166 outwardly to the extreme limit of their sliding movement as indicated in Fig. 2 at 170 and 172, after the capsule has been formed, which outward movement of the ejection elements 166 will insure removal of the capsules from the forming flanges in the event that they do not fall therefrom by gravity.

Brackets 174 and 176 are secured to the supporting frame 60 in any suitable manner as by means of bolts 178 and each is provided with spaced apart depending arms 180 and 182. A pair of rollers 184 and 186 are journalled in depending relation upon the shafts 188 and 190 which are supported in the bracket arms 180 and 182. Each of these rollers is preferably cloth covered for the purpose of driving the webs and includes a ring gear portion 192 and 194 adapted to mesh with one another and ring gear 192 is so positioned as to mesh with the ring gear 148.

Extending from each of the arms 180 and 182 of the brackets 174 and 176 respectively are arms 196 and 198. Each pair of arms is apertured to rotatably support the shaft 200 upon which is mounted an oiler roll 202, this oiler roll being provided with a ring gear portion 204 which is adapted to mesh with ring gear portion 192 of roll 184 and also with the ring gear portion 204 of a similar oiler roll 206 journalled upon shaft 208 floatingly supported for rotation within the bifurcated upper extremity 210 of the arms 196 and 198.

Reference now being had to Fig. 2 it will be clear that the webs 18 and 20 having the gelatine strip 78 deposited thereon are brought over the tension rollers 26 and 28, between the respective rolls 184 and its associated oiler roll 202, at which point the webs 18 and 20 continue around the rolls 184 and 186 respectively and the gelatine strip is separated from its supporting web and carried between the oiler rolls 202 and 206. The webs 18 and 20, each of which constitutes an endless conveyor for the strip 78 from the spreader 16 to the point just described, at which it is separated from its supporting web, continues in an S curve over the rollers 184 and 186, thence around the idler rolls 212 and 214 respectively to again receive a deposit of liquid gelatine in strip form to be carried to the capsule forming mechanism.

The mechanism for injecting the fluid substance is most clearly illustrated in Figs. 2, 5, and 6. It comprises a pair of parallel positioning units 216 and 218, the extremities of which are curved downwardly as indicated in Fig. 2 to seat upon the die rolls 154 on each side of the capsule forming flanges 162. These positioning members are secured together by a solid member 220 extending transversely therebetween intermediate their extremities and secured thereto in any suitable manner. Guide rolls 224 are journalled for rotation between the positioning members 216 and 218. Guide supports 222 are rigidly supported between members 216 and 218 and in turn rigidly support guide rods 226 and 228, which guide rods are spaced apart a distance corresponding to the width of the gelatine strip being carried to the capsule forming mechanism. The solid unit 220 is provided with three apertures extending therethrough, the central aperture 230 being adapted to receive a threaded guide rod 236 and the other two apertures 232 and 234 being adapted to receive similar guide rods 238 and 240, these latter guide rods being unthreaded.

Said rods 236, 238 and 240, are secured to the upper extremity of the injecting member 242 and a cap screw 244 serves to retain the said member in adjusted position relative to the positioning elements 216 and 218.

The injecting element 242 is an inverted substantially triangular member, the sides of which are concave, with the radius related to that of the curvature radius of the die roll 154. The said element 242 is bored out as at 246 to receive a heating coil assembly generally indicated by numeral 248, which assembly comprises a plurality of rods 250, 252, and 256, supported transversely between positioning walls 258 and 260. The electric coil 262 is wound about the frame work provided by the transverse bars 250, 252, and 256, and terminal facilities 264 and 266 extend through the face plate 268 which closes the open end of the bored out portion 246.

The fluid substance, which may well be a medicinal substance of some sort, is fed through the conduit 270 into a passage 272 bored in the body of the injecting element 242. A thermometer 274 is positioned within the space which houses the heating coil by means of a sleeve 276 which extends laterally from the face plate 268, the bulb 278 of the thermometer being positioned interiorly of the electric coil 262 as clearly illustrated in Figs. 5 and 6. The bored out portion of the injecting element 242 wherein the heating coil and thermometer bulb are positioned is preferably filled with a conducting medium of some kind whereby the heat from the coil may be readily transferred to the walls of the injecting element 242 to raise the temperature of the adjacent gelatine strips to the proper point.

As illustrated in Fig. 5 the passage 272 is provided with oppositely extending relatively minute passageways 280 and 282 through which the fluid substance may flow to be deposited upon the flat face of the gelatine strip 78 traveling across the opening of the said passageway. While I have illustrated a specific form of injecting element, it will be understood that other elements adapted to function in the same manner may be designed. The important features are that the strips be held in close contact with the element to exclude air and that means be provided for positioning a fluid substance upon the surface of one or both of the strips while the air is excluded.

The fluid substance is supplied from a tank and is pumped into the injecting element by means of a pump which is timed in relation to the die roll in a manner to be described hereinafter. The guide rolls 224 are so positioned with relation to the extremities of the base of the triangular injection element 242 that the gelatine strips follow a substantially S formation around the rounded base angles 284 and 286 of the injection element and bear intimately thereagainst, thus eliminating any air between the strip and the surface of the injection element 242. While the position of the injecting element 242 may be adjusted with relation to the positioning bars 218 and 216, it is preferable that the cap screw 244 be loosened to such an extent that the injection element substantially floats upon the gelatine strips which are in turn supported by the capsule die forming flanges 162. It will be apparent from Fig. 5 that as the die rolls 154 continue to rotate, the opposed capsule forming flanges 162 will retain the margin of those particular portions of the gelatine strip which are to form the capsule tight against the curved surface of the injection element 242.

The fluid substance may be stored in a supply tank 288 which may be supported upon a bracket 290 secured conveniently to the supporting frame 60. A conduit 292 extends from the supply tank to the chamber of pump 294, from which chamber a second conduit 296 extends to a three way valve 298. The three way valve properly adjusted will permit the substance to flow through the passage 300 back into conduit 292 and then recirculate through the pump chamber. When adjusted in its other position the said valve directs the flow of the fluid from the conduit 296 around the injecting conduit 270, the extremity of which terminates within the bored out passageway 272 as indicated in Fig. 6.

Referring now particularly to Figs. 3 and 4, pump chamber 294 is provided with a pump plunger 304 which is adapted to be actuated by a cam 306 secured to a shaft 308 journalled in parallel relation to shaft 104 and provided at one extremity with gear wheel 108 which is positioned to mesh with driving pinion 106. In this manner the pump is actuated by the same mechanism which actuates the other moving parts of the machine and in timed relation thereto. A coil spring 312 retains the head of the plunger 304 in constant engagement with the cam 306.

The cam is so positioned upon its actuating shaft 308 that the pump plunger is forced inwardly to inject a measured quantity of fluid substance through the minute passageways 280 and 282 upon the converging gelatine strips as each portion of the said strip lying within the circumference of the capsule forming flanges 162 passes the said passageway. As already explained, there is no possibility of air being mixed with this deposit upon the gelatine by reason of the particular arrangement of parts whereby the capsule forming portions of the gelatine strips are retained in close contact with the curved surfaces of the injection element 242.

The inverted apex 314 of the injection element constitutes a straight edge. As the rear edge of the die flange 162 passes and leaves its respective passageway 280 or 282 there will be a tendency for the gelatine strip (which between successive dies is no longer in intimate contact with the surface of injecting element 242) to wipe away a small portion of the fluid substance which remains within the passageway. The result will be that a certain amount of air is permitted to enter the passageways 280 and 282. When the leading edge of the die flanges 162 have passed the respective injection passageways 280 and 282, this air would normally be injected upon that portion of the gelatine strips which are to form the next capsule and to counteract or eliminate this possibility I have so designed the cam 306 which actuates the pump plunger 304 that it imparts a very slight preliminary stroke to the said plunger immediately prior to the passing of the leading edges of the die flanges over the injecting passageways 280 and 282. This is accomplished by means of a small pin 316 projecting from the cam face (see Fig. 3) and so positioned on the cam that a slight movement of the pump plunger will occur at the time specified. The result of this slight pump plunger movement will be to completely fill the injection passageways 280 and 282. In this way no air is available to form air bubbles in the finished product.

As the gelatine area delineated by each die flange covers the respective injection passages 280 and 282, the pump, operating in timed relation to the movement of the die rolls and gelatine strips, begins to function. Fluid substance is forced upon the flat gelatine surfaces lying within the confines of the respective die flanges and tends to push that portion of the elastic material inwardly, thereby forming what might be regarded as a pocket completely filled with the substance. The proportioning of the elements, to wit, the die flanges and the distance between the injection passages 280, 282, and the apex 314 of the triangular injection element, are such that the leading edges of oppositely disposed die flanges engage with one another at substantially the same time that the rear edges of said flanges begin to pass over the passages 280 and 282 respectively. The closing and actual sealing of the covering about the interior substance begins, therefore, practically at once after the completion of the injection operation.

The leading portions of the die flanges 162 abut one another (see Fig. 5) to press the strips firmly together and seal them. The fluid substance is further bulged out, within that portion which lies inside the circumference of the die flanges 162, into substantially symmetrical forms as the flanges urge the covering material about the substance already deposited. As will be apparent from Fig. 5 the edges of the circular die flanges first form a seal and subsequently substantially cut away the capsule so formed from the strips of gelatine.

An important feature of the invention resides in the fact that each of the die flanges is beveled or rounded across its upper surface in contradistinction to the usual flat head dies which are utilized in the method hitherto prevailing in this art. The purpose of these rounded edges is to insure a clean cut uniform joint where the two symmetrical segments are sealed and to eliminate the ragged edges which result from the dragging action of the usual straight edge die flange. It is important to note that if the outer edges of the die forming flanges 162 constituted straight edges, as they approached one another (see Fig. 5) upon rotation of the die rolls 154 the outer edges of the forming flanges would be the leading edges which first contacted the gelatine strips. As the rolls 154 continued to rotate the inner edges of said flanges would become the leading edges to first contact the strips. Therefore it is important that the edges of the flanges be rounded or beveled so that the center of each forming flange will always be the leading edge to contact the strips. This insures a uniform seal around the entire circumference of the capsule and a symmetrical capsule.

As already stated, the capable has now been cut away from the gelatine strips and is free to fall into a guide chute 36 from which they may be deposited in any suitable receptacle. Should the capsule so formed stick to either one of the die flanges the injector elements 166 are forced outwardly as illustrated in Fig. 5 by means of stationary cams 144 and 146 as the die rolls continue to revolve, thereby removing the capsule so adhering to either one of the dies. As illustrated in Fig. 8, each of these ejectors 168 is provided with a longitudinal slot 318 along one wall as an air vent.

The guide chute 36 is positioned by means of a pair of cylindrical sleeves 320 welded thereto, said cylindrical sleeves being adapted to slide upon the projecting rods 322, which rods likewise form an axis about which the idler ring gears 324 and 326 are adapted to rotate. The upper edges 328 and 330 of the side walls of the guide chute 36 are contiguous to the periphery of the die roll and are adapted to strip off any capsule which may resist the ejecting action of the ejectors 166.

The idler ring gears 324 and 326 mesh with the ring gears 148 and also with the pinions 332 and 334, which latter pinions are rotatably mounted upon shafts 336 and 338 projecting laterally away from the base casting 94. These pinions are spaced apart a distance which will permit them to exert frictional drawing action upon the gelatine strips which have been threaded through the slot 340 in the chute 36, while at the same time permitting sliding movement thereover to prevent the possibility of exerting such drawing action on the strips as to tear them. Immediately before reaching the slot 340 the strips are threaded through a pair of substantially parallel bars 342 and 344 which insure the separation of the capsules from the strip and discharge them into the chute 36.

The gelatine strips, as aforesaid, may be then deposited in the waste container 44 and subsequently again utilized in the supply chamber 10 to form fresh gelatinous strips to be carried through the capsule forming mechanism.

While I have not so illustrated the structure in the drawings, the oil rolls 202 and 206 should preferably be hollow to receive a supply of oil which is slowly forced through the porous surfaces of the rollers to oil both sides of the gelatine strip after it is stripped from its respective supporting web. The injecting element 242, or injecting segment, is heated for the purpose of transmitting a certain amount of heat to the gelatine strip prior to the formation of the capsule to render the said gelatine suitable for sealing the capsule. It is important that the gelatine be heated somewhat prior to the formation of the capsule for the additional reason of temporarily weakening the gelatinous structure somewhat and rendering it more elastic than it would otherwise be so that it may be distorted into the shape necessary to form the capsules without tearing the gelatine structure. This temporary weakening of the gelatine is necessary because of the fact that a certain amount of pressure is exerted by the fluid substance upon the seal, the strength of which is relatively small immediately following formation.

The purpose of running the gelatine strips between the oil rolls prior to the formation of the capsule is primarily to lubricate the upper surface of the gelatine strip which comes in contact with the surface of the injecting element over which it must slide.

While I have illustrated a preferred mechanism for use in conjunction with my improved method of forming capsules, it will be noted that the particular structure described and illustrated in this application is only one of an indeterminate number which would be capable of performing the operations necessary to the successful formation of capsules in the manner illustrated. For that reason I do not wish to limit myself to the specific mechanism illustrated but rather by the broader terminology of the claims.

Furthermore, the basic principles involved in the formation of a capsule by operating upon a pair of converging strips of gelatine, the positioning of a fluid substance on one or more of the adjacent faces thereof, and the subsequent pressure applied through revolving die rolls to form a capsule about the substance, are regarded by me as broadly new.

I claim:—

1. A method of making capsules comprising the steps of feeding a pair of strips of plastic material in converging paths towards each other, depositing fluid filling substance onto the inner side of a defined portion of each strip, and simultaneously deforming said portions to produce a cavity to receive the filling substance, and then progressively sealing the inner faces of the strips together around the contents as they emerge from said paths and converge together.

2. A method of making capsules comprising feeding a pair of strips of plastic capsule forming material along converging paths toward each other, depositing the fluid filling substance upon a defined area of at least one of said strips, and simultaneously deforming said area to form a cavity to receive said fluid filling substance sealing said strips together around said fluid filling substance as they emerge from said converging paths into convergence with each other.

3. That process of making capsules as defined in claim 2 characterized in that the area upon which the fluid filling substance is deposited is sealed against the entrance of air thereinto prior to and during the step of depositing fluid filling substance thereon and thereafter until the step of sealing the two strips together around said fluid filler is completed.

4. That process of making capsules as defined in claim 2 characterized in that the strip is deformed to form the cavity to receive the filling substance under the pressure of the filling substance deposited thereagainst.

5. The method of making capsules comprising the steps of feeding a pair of strips of plastic material along converging paths toward each other, depositing a quantity of fluid filling material onto the inner surface of the defined complementary portions of said strips and simultaneously deforming said portions producing cavities to receive said quantity of said fluid filling material, sealing the edges of said complementary portions together around the fluid contents as the strips emerge from said converging paths and converge together.

6. Apparatus for forming fluid filled capsules comprising means for feeding a pair of strips of plastic material along converging paths into juxtaposition including a pair of rotating die rolls provided with correspondingly positioned recesses having outwardly projecting peripheral die flanges adapted to be brought into registration, and a segmental ejector element disposed between and adjacent to the meeting point of said rolls and provided with complementary concave surfaces adjacent to said rolls, and means for feeding said strips of plastic material between the concave faces of said ejector element and said rolls and into convergence between said rolls.

7. Apparatus as defined in claim 6 characterized in that means are provided for ejecting fluid substance through the concave surface of said element onto the surface of the plastic strip opposite a recess in the die roll.

8. Apparatus as defined in claim 6 characterized in that the ejector element is provided with rounded upper corners over which the strips travel and against which they are positively urged.

9. Apparatus as defined in claim 6 characterized in that means are provided for ejecting fluid filling substance through the concave surface of said ejector element onto the adjacent surfaces of the plastic strips opposite the recesses in the die rolls and the peripheral flanges of the recesses of the die rolls urge those portions of the strip bounded thereby against the opposite surface of the ejector element sealing said portions of the strips thereagainst.

ROBERT P. SCHERER.